(12) United States Patent
Jeong et al.

(10) Patent No.: US 12,447,816 B2
(45) Date of Patent: Oct. 21, 2025

(54) ACTIVE AIR FLAP SYSTEM FOR A VEHICLE

(71) Applicants: HYUNDAI MOTOR COMPANY, Seoul (KR); KIA CORPORATION, Seoul (KR); HYUNDAI MOBIS CO., LTD., Seoul (KR)

(72) Inventors: Phil-Jung Jeong, Seongnam-si (KR); Kyeong-Am Lee, Yongin-si (KR); Jae-Sup Byun, Seongnam-si (KR)

(73) Assignees: HYUNDAI MOTOR COMPANY, Seoul (KR); KIA CORPORTATION, Seoul (KR); HYUNDAI MOBIS CO., LTD., Seoul (KR)

( * ) Notice: Subject to any disclaimer, the term of this patent is extended or adjusted under 35 U.S.C. 154(b) by 492 days.

(21) Appl. No.: 17/901,010

(22) Filed: Sep. 1, 2022

(65) Prior Publication Data
US 2023/0202289 A1   Jun. 29, 2023

(30) Foreign Application Priority Data
Dec. 28, 2021 (KR) ........................ 10-2021-0189650

(51) Int. Cl.
*B60K 11/08* (2006.01)
*B60H 1/00* (2006.01)

(52) U.S. Cl.
CPC ........ *B60K 11/085* (2013.01); *B60H 1/00671* (2013.01)

(58) Field of Classification Search
CPC ....... B60K 11/085; B60K 11/08; B60R 19/52; B60R 2019/525; F01P 7/10; B60H 1/00671; B60H 1/00664; B60H 1/00678; B60H 1/00507; B60H 1/00692; B60H 2001/00707
See application file for complete search history.

(56) References Cited

U.S. PATENT DOCUMENTS

| | | | |
|---|---|---|---|
| 9,662,963 B2 * | 5/2017 | Schneider | B60H 1/3421 |
| 10,017,048 B2 * | 7/2018 | Manhire | B60R 19/52 |
| 10,118,480 B2 * | 11/2018 | Yasui | B60K 11/085 |
| 10,913,415 B2 | 2/2021 | Kim et al. | |
| 11,987,116 B2 * | 5/2024 | Müller | B60R 19/52 |
| 2009/0149124 A1 * | 6/2009 | Stevenson | B60H 1/00671 454/358 |
| 2019/0299888 A1 | 10/2019 | Kim et al. | |

FOREIGN PATENT DOCUMENTS

KR  20190114565 A  10/2019

* cited by examiner

*Primary Examiner* — James A Shriver, II
*Assistant Examiner* — Nicholas R. Kandas
(74) *Attorney, Agent, or Firm* — Lempia Summerfield Katz LLC

(57) ABSTRACT

An active air flap system for a vehicle is provided. The system includes an exterior surface having at least one or more openings, a housing provided on a rear side of the exterior surface, a flap rotatably mounted on the housing, and a driving section rotating the flap to open and close the openings. The driving section has a dual link structure including a first link moving in a vertical direction and a second link connecting the first link and a flap linkage forming an operating shaft of the flap, so that when the flap is operated, the rotation angle of the flap is increased, and interference between the flap and the bumper is prevented from occurring.

17 Claims, 18 Drawing Sheets

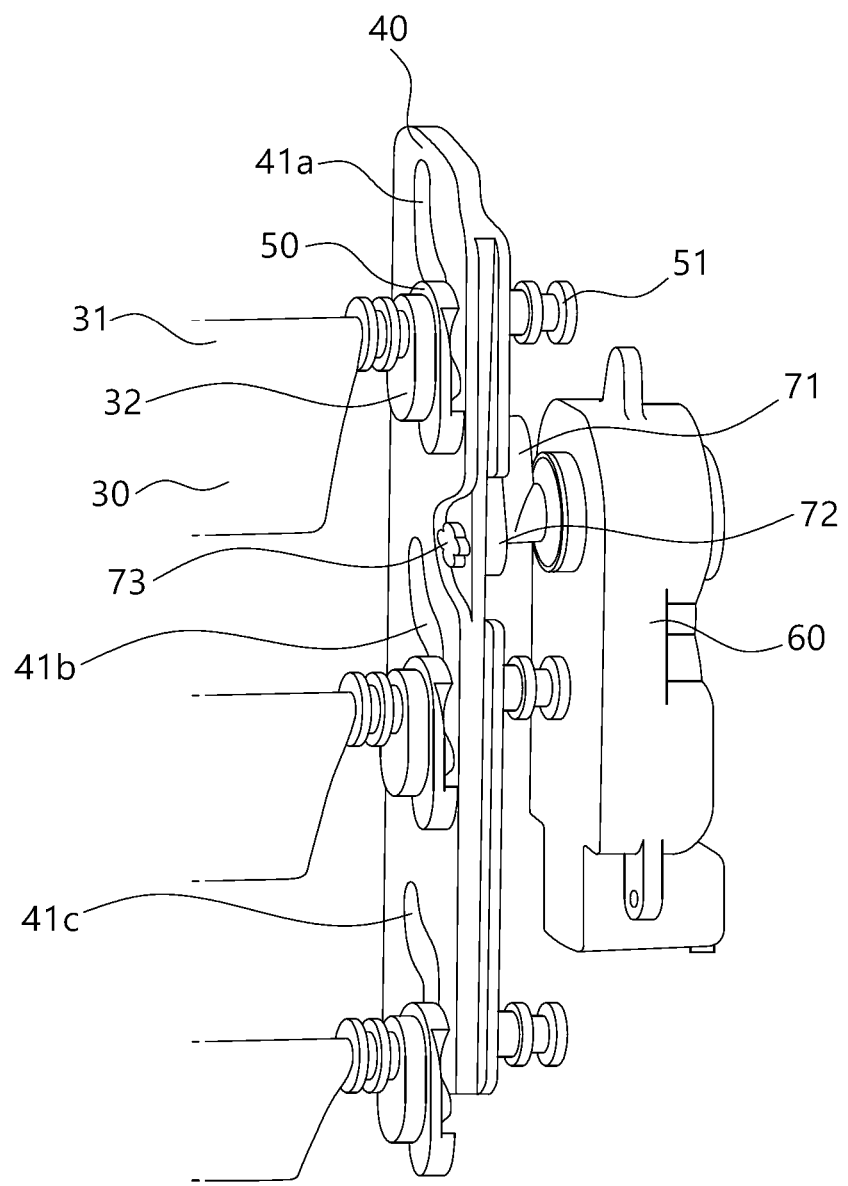

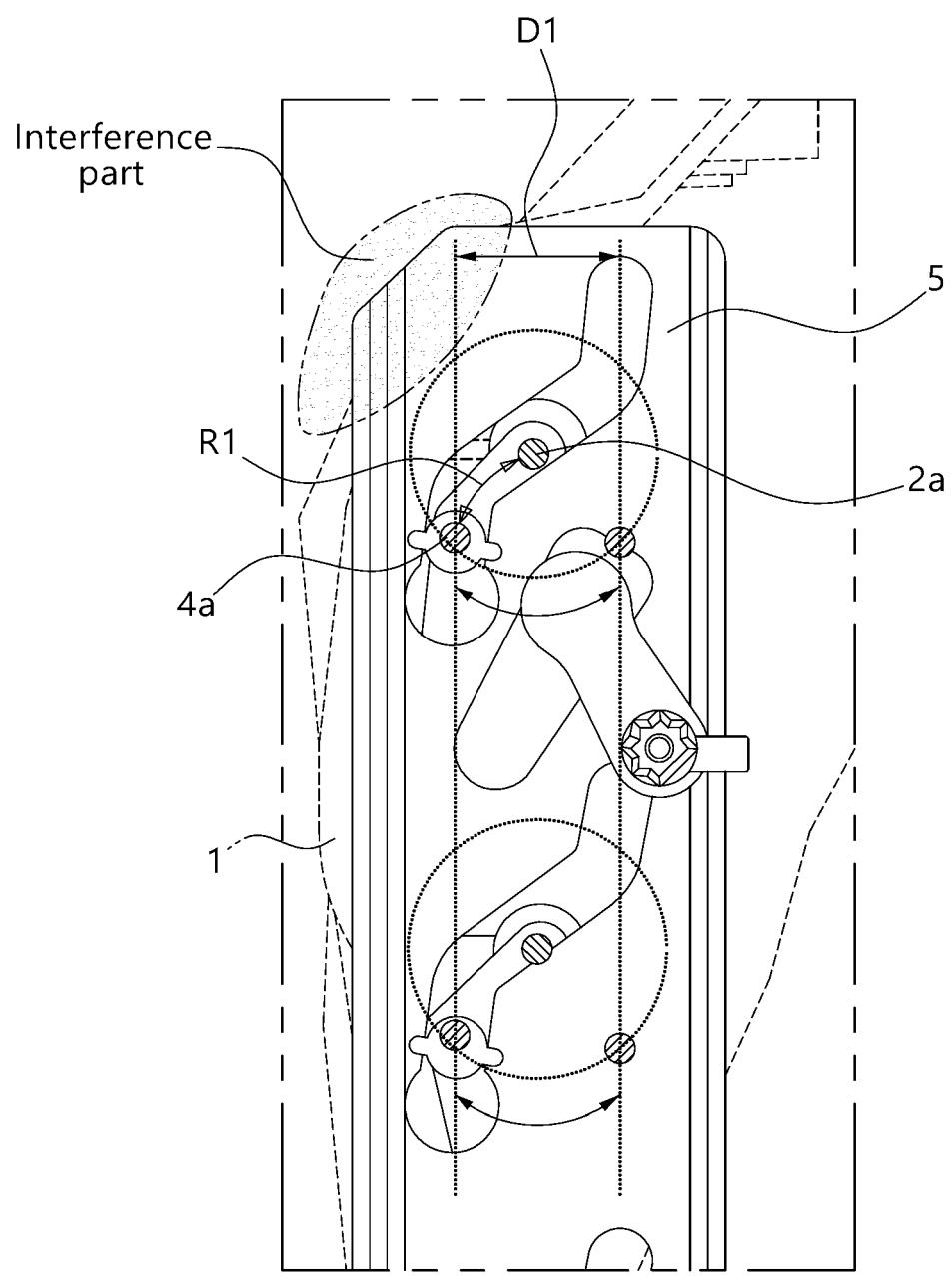
FIG. 8A "PRIOR ART"

FIG. 10
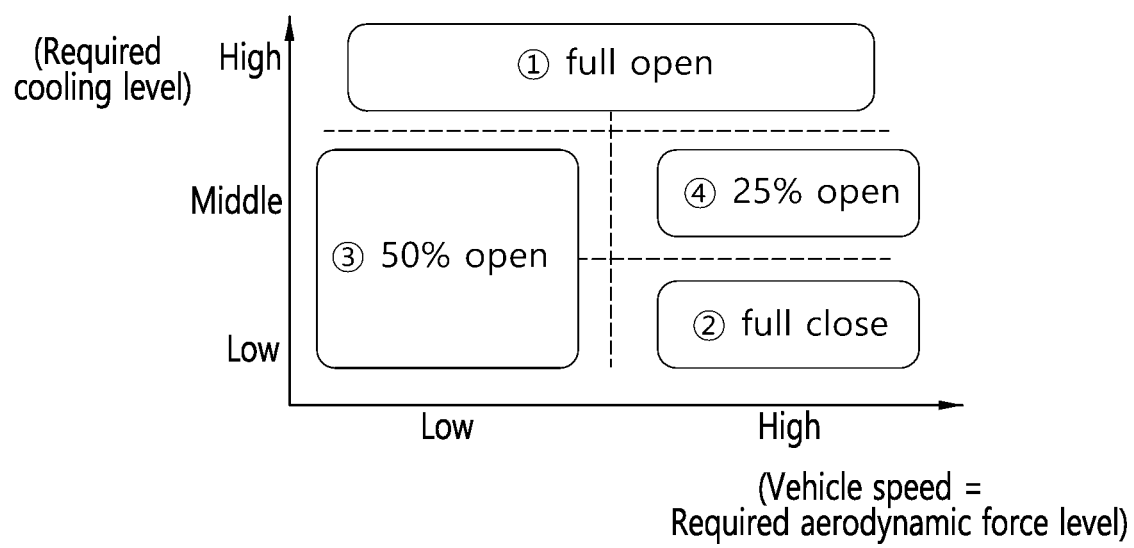
FIG. 11A "PRIOR ART"
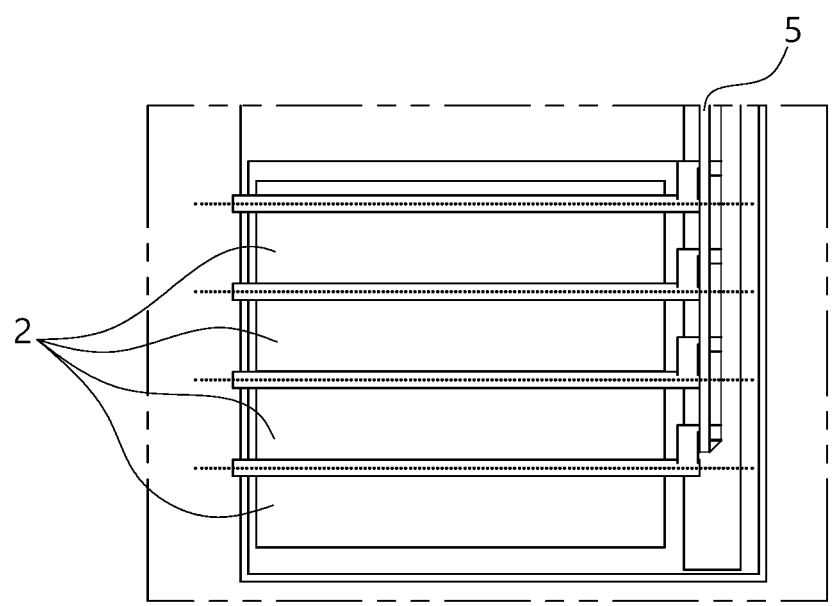

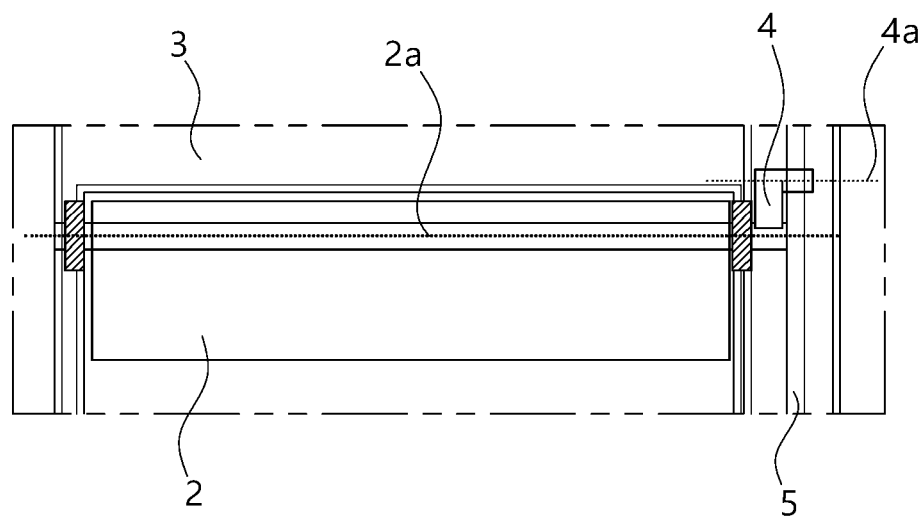
FIG. 11B "PRIOR ART"

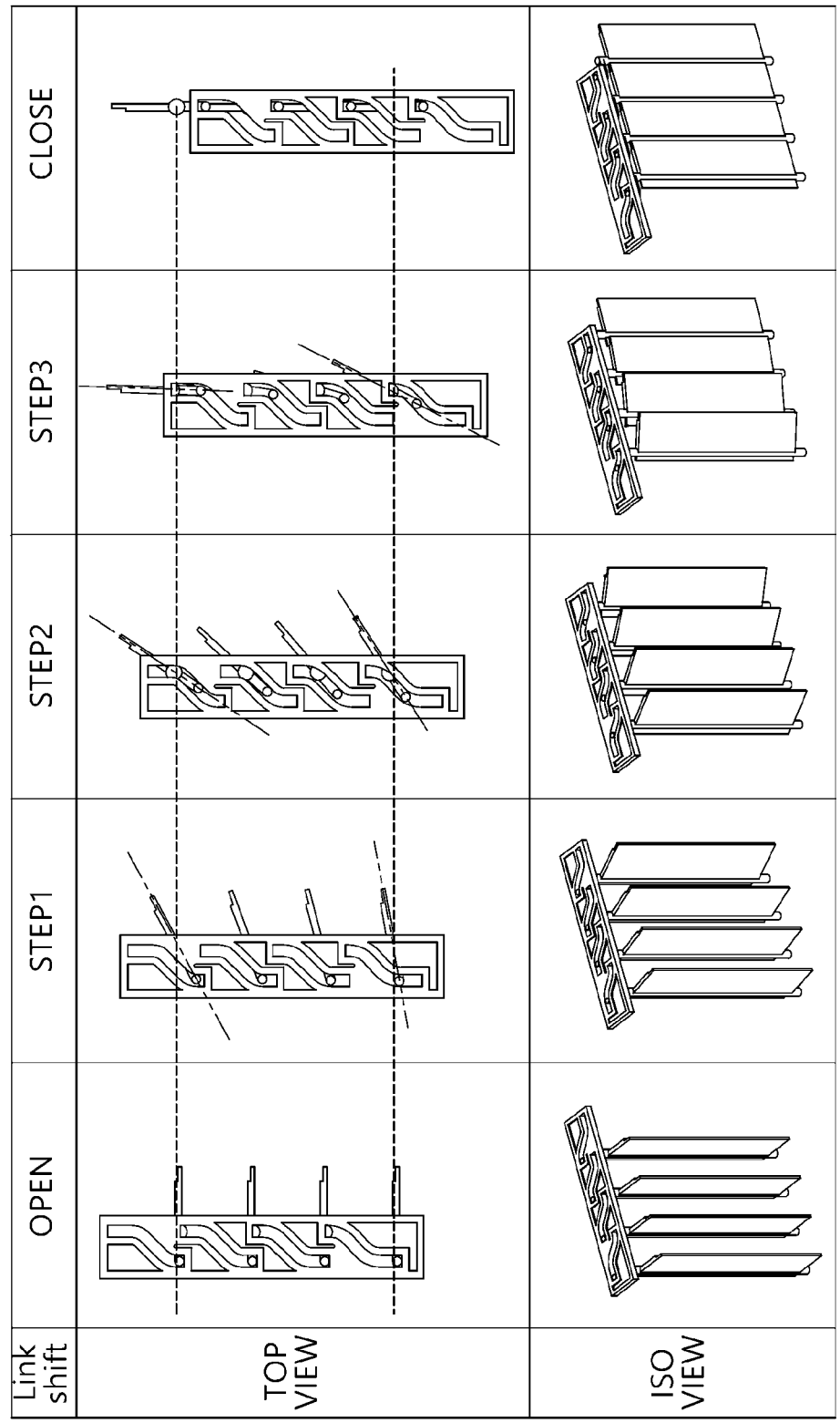
FIG. 12 "PRIOR ART"

FIG. 13A "PRIOR ART"
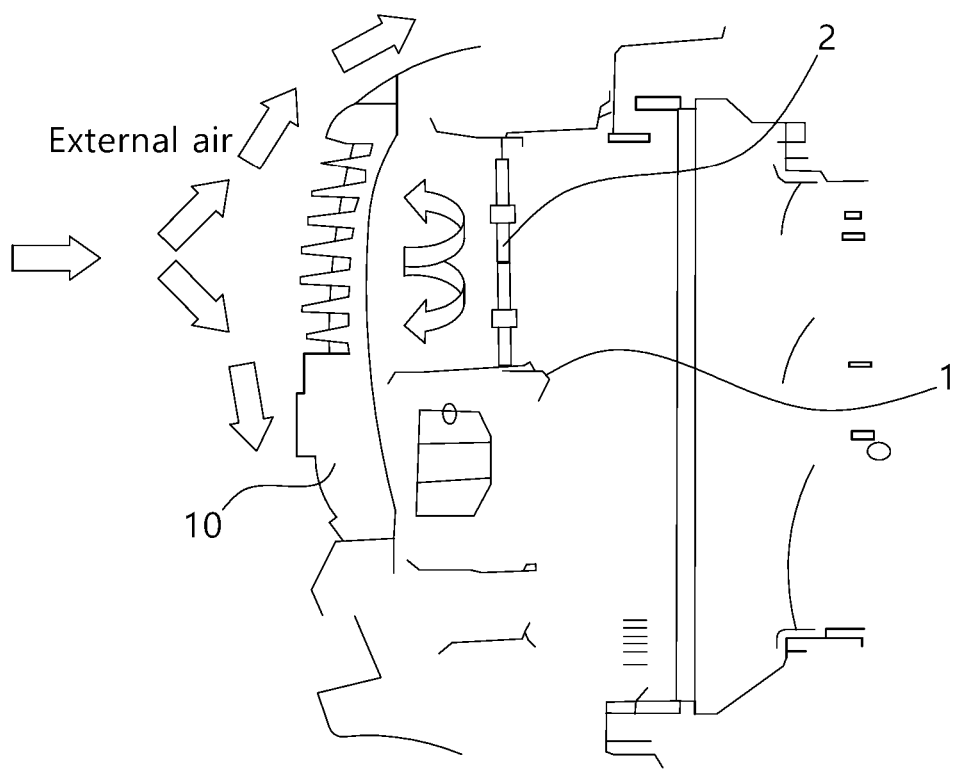

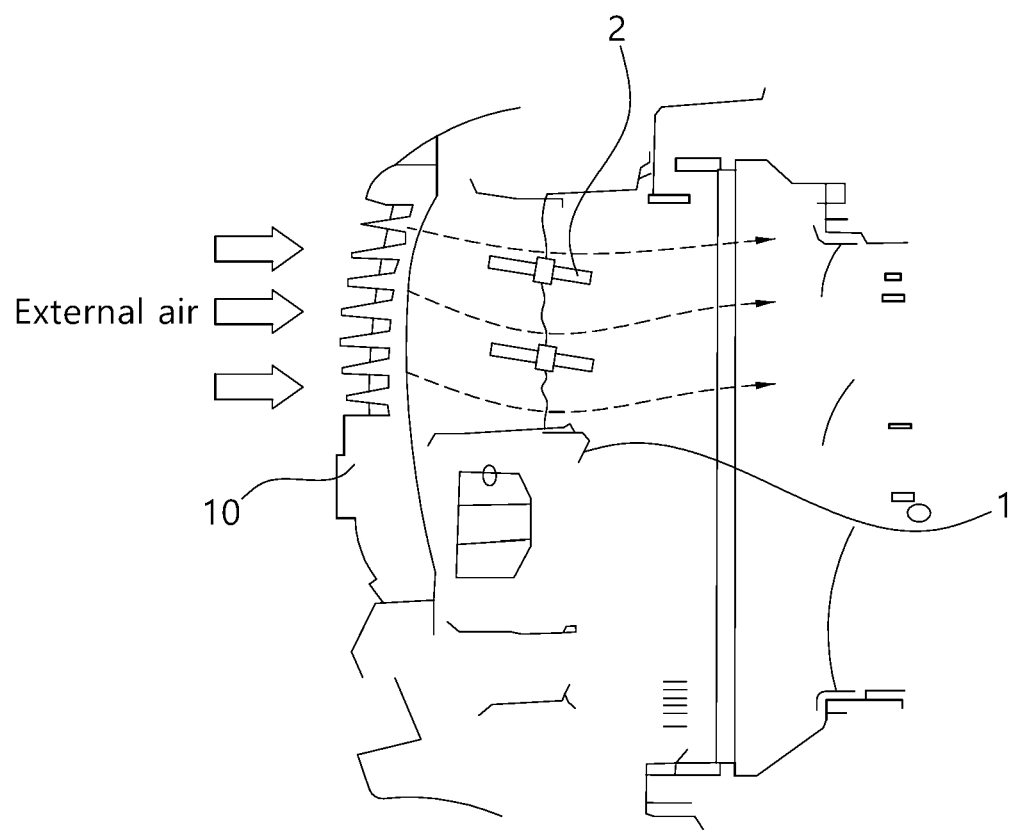
FIG. 13B "PRIOR ART"

ACTIVE AIR FLAP SYSTEM FOR A VEHICLE

CROSS-REFERENCE TO RELATED APPLICATION

This application claims priority to and the benefits of Korean Patent Application No. 10-2021-0189650, filed on Dec. 28, 2021, the entire contents of which are incorporated herein by reference.

BACKGROUND

Field

The present disclosure relates to an active air flap system for a vehicle and, more particularly, to an active air flap system for a vehicle, in which a plurality of flaps can be sequentially operated.

Description of Related Art

A vehicle-front side space located in front of a vehicle interior for occupants may accommodate a power mechanism such as an internal combustion engine (for an internal combustion engine vehicle), an electric motor (for an electric vehicle), and the like, as well as a plurality of heat exchangers such as a radiator, a condenser, an intercooler, and the like. As illustrated in FIGS. 13A and 13B, a grill 10 such as a radiator grill is mounted on a front side of a vehicle to protect the above-described components provided in the vehicle-front side space. In addition, in order to cool the internal combustion engine, the electric motor, the heat exchanger, etc., the grill 10 is provided with a plurality of vents through which external air can flow.

Meanwhile, when a vehicle is traveling at a low speed, a flow rate of external air flowing into the vehicle-front side space through the vents is relatively low, and when a vehicle is traveling at a high speed, a flow rate of external air flowing into the vehicle-front side space through the vents of the grill may be relatively high.

As illustrated in FIG. 13B, when a flow rate of external air flowing into the vehicle-front side space through the vents of the grill 10 is high, the cooling performance (and thermal damage prevention performance) may be improved, whereas, due to an increase in the flow rate of external air, the aerodynamic characteristics of a vehicle may be reduced. On the other hand, as illustrated in FIG. 13A, when a flow rate of external air flowing into the vehicle-front side space through the vents of the grill 10 is relatively low or absent, the cooling performance (and thermal damage prevention performance) may be reduced, whereas the aerodynamic characteristics of a vehicle may be improved.

As such, the flow rate of external air may vary according to a change in the vehicle speed, and the cooling performance and the aerodynamic performance may conflict with each other according to the change in the flow rate of external air.

In order to overcome this problem, there is known a technique for compromising the cooling performance and the aerodynamic performance that conflict with each other through appropriate adjustment of a flow rate, an inflow direction, or the like of external air by applying an active air flap system that adjusts the opening and closing of air flaps according to a vehicle speed, ambient temperature, etc.

The contents described in Description of Related Art are to help the understanding of the background of the present disclosure, and may include what is not previously known to those having ordinary skill in the art to which the present disclosure pertains.

SUMMARY

The present disclosure provides a vehicle active air flap system in which a plurality of flaps can be sequentially operated, and during the operation of the flaps, the rotation angle of the flaps is increased while preventing interference with a bumper.

In an aspect of the present disclosure, an active air flap system includes: an exterior surface disposed on a vehicle front side and having at least one or more openings through which external air is supplied into a vehicle interior; a housing provided on a rear side of the exterior surface in a vehicle front-rear direction; a plurality of flaps rotatably mounted on the housing to open and close the openings; and a driving section configured to rotate the flaps to open and close the openings, wherein the driving section includes a first link provided to be able to linearly reciprocate within the housing and having a plurality of first guide holes corresponding to the plurality of flaps, respectively; a plurality of second links having first ends guided by the respective first guide holes of the first link; and a plurality of flap linkages having first ends and second ends, wherein the first ends of the flap linkages are rotatably connected to second ends of the second link, respectively, and the second ends of the flap linkages are connected to the flaps, respectively.

As described above, according to the present disclosure, a double link structure is provided in which the second link is provided between the flap linkage for directly rotating the plurality of flaps and the first link performing the linear reciprocating motion in a vertical direction, and according to the linear reciprocating motion of the first link, the second link rotates while performing a linear reciprocating motion in the horizontal direction so as to rotate the flap linkage.

Due to the addition of the second link as described above, it is possible to relatively shorten the flap side rotation radius and flap operating section compared to the related art, and depending on the length of the second link, the flap operating section can be disposed behind the rotation axis, thereby allowing the first link to be shifted toward the rear side in the vehicle front-rear direction. Therefore, even in the case of a vehicle having a bumper design with a large curvature, it is possible to avoid interference between the bumper skin surface and the mechanism of the active air flap and to increase the rotation angle of the flap at the same time.

In one embodiment, the plurality of first guide holes may be formed to have different shapes so that the plurality of flaps rotates with a time difference from each other with the linear reciprocating movement of the first link, In another embodiment, the first guide holes may each include: a first straight portion extending in a first direction; and an inclined portion extending from the first straight portion in a direction inclined with respect to the first direction.

In another embodiment, among at least some of the first guide holes, the lengths of all of the first guide holes each including the first straight portion and the inclined portion in the first direction may be the same, and the lengths of the first straight portions may be different from each other.

In another embodiment, the first guide hole may further include a second straight portion extending from the inclined portion in the first direction.

In another embodiment, among at least some of the first guide holes, the lengths of all of the first guide holes each including the first straight portion, the inclined portion, and the second straight portion in the first direction may be the same, and the lengths of the first straight portion and the second straight portion may be different from each other.

In another embodiment, the flap may further include a rotation shaft member, wherein the first end of the flap linkage may be fixed to a first axial end of the rotation shaft member, a second axial end of the rotation shaft member may be rotatably connected to the housing, and the second end of the flap linkage may be rotatably connected to the second end of the second link.

In another embodiment, a guide pin may be formed to protrude from the first end of the second link so as to be inserted into the first guide hole, and the housing may be further provided with a second guide hole, through which the guide pin is inserted through the first guide hole, to guide the reciprocating linear motion of the guide pin.

In other embodiment, the second guide hole may be formed in the housing such that one end thereof is opened, and a cover may be provided on the housing to cover the open end of the second guide hole.

In other embodiment, the second guide hole may extend from the housing to the cover.

In other embodiment, the active air flap system may further include: an actuator; and a loader connecting the first link and the actuator, wherein the loader may include a first loader portion having a first end connected to an output end of the actuator so as to rotate integrally with the actuator, and a second loader portion having a first end and a second end, wherein the first end may be rotatably connected to a second end of the first loader portion, and the second end may be rotatably connected to the first link.

In other embodiment, the rotation shaft member may be provided with a plurality of flap members along the longitudinal direction of the rotation shaft member, wherein the plurality of flap members may be configured to integrally open and close a plurality of openings formed in the exterior surface along a longitudinal direction of the exterior surface in response to the rotation of the rotation shaft member.

In other embodiment, a guide pin may be formed to protrude from the first end of the second link so as to be inserted into the first guide hole, and a holding portion may be formed along an outer periphery of the guide pin to regulate an axial movement of the guide pin.

In other embodiment, the flap may have a protrusion having the shape of the opening.

In one embodiment, a front surface of the protrusion may be configured to be flush with the exterior surface in a state in which the flap closes the opening.

In other embodiment, the active air flap system may further include: a controller configured to control the actuator, wherein the controller may receive a signal related to at least one of a vehicle speed, an atmospheric temperature, a refrigerant pressure, and a coolant temperature from a sensor mounted on a vehicle, and control the degree of opening and closing of the respective flaps on the basis of the received signal.

According to the vehicle active air flap system of the present disclosure, the position of the first link can be shifted toward the rear side of a vehicle, compared to the related art. Accordingly, even in the case of a vehicle having a bumper design with a large curvature, it is possible to avoid interference between the bumper skin surface and the mechanism portion of the active air flap while increasing the rotation angle of the flap.

In addition, according to the vehicle active air flap system of the present disclosure, it is possible to relatively close the flap to the grill so that the flap surface is flush with the grill, which is the exterior surface. Therefore, it is possible to build a continuous skin line in front of a vehicle without a step that visually gives a sense of heterogeneity, thereby improving aesthetics.

Further, according to the vehicle active air flap system of the present disclosure, depending on the length of the straight section of the plurality of guide holes provided in the first link, it is possible to vary the sequential operation timing for each flap. In addition, the rotation angle of the flap may be determined according to the shape of the inclined portion of the guide hole. Further, the position of the first link in the vehicle front-rear direction may be shifted by the length of the second link. Accordingly, it is possible to secure a wide degree of freedom in design.

Furthermore, according to the vehicle active air flap system of the present disclosure, it is possible to sequentially operate the plurality of flaps. Therefore, it is possible to adjust the rotation start time and opening amount of the flap by the amount of cooling required according to the driving condition of a vehicle so as to realize the optimal aerodynamic and cooling performance, thereby maximizing fuel efficiency.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 3 is a partially enlarged view illustrating a mounting structure of a flap 30, a flap linkage 32, a second link 50, a first link 40, loader portions 71 and 72, and an actuator 60 of an active air flap system according to an embodiment of the present disclosure;

FIG. 8A is a side view illustrating a mechanism portion of an active air flap system according to the related art;

FIG. 10 is a graph illustrating the degree of flap opening according to a vehicle speed and required cooling performance;

FIG. 11A is a plan view illustrating an active air flap system according to the related art;

FIG. 11B is a partially enlarged view of FIG. 11A;

FIG. 12 is a view illustrating a flap driving method using an active air flap system according to the related art; and FIGS. 13A and 13B are views illustrating a conventional flap system.

Figure 1:
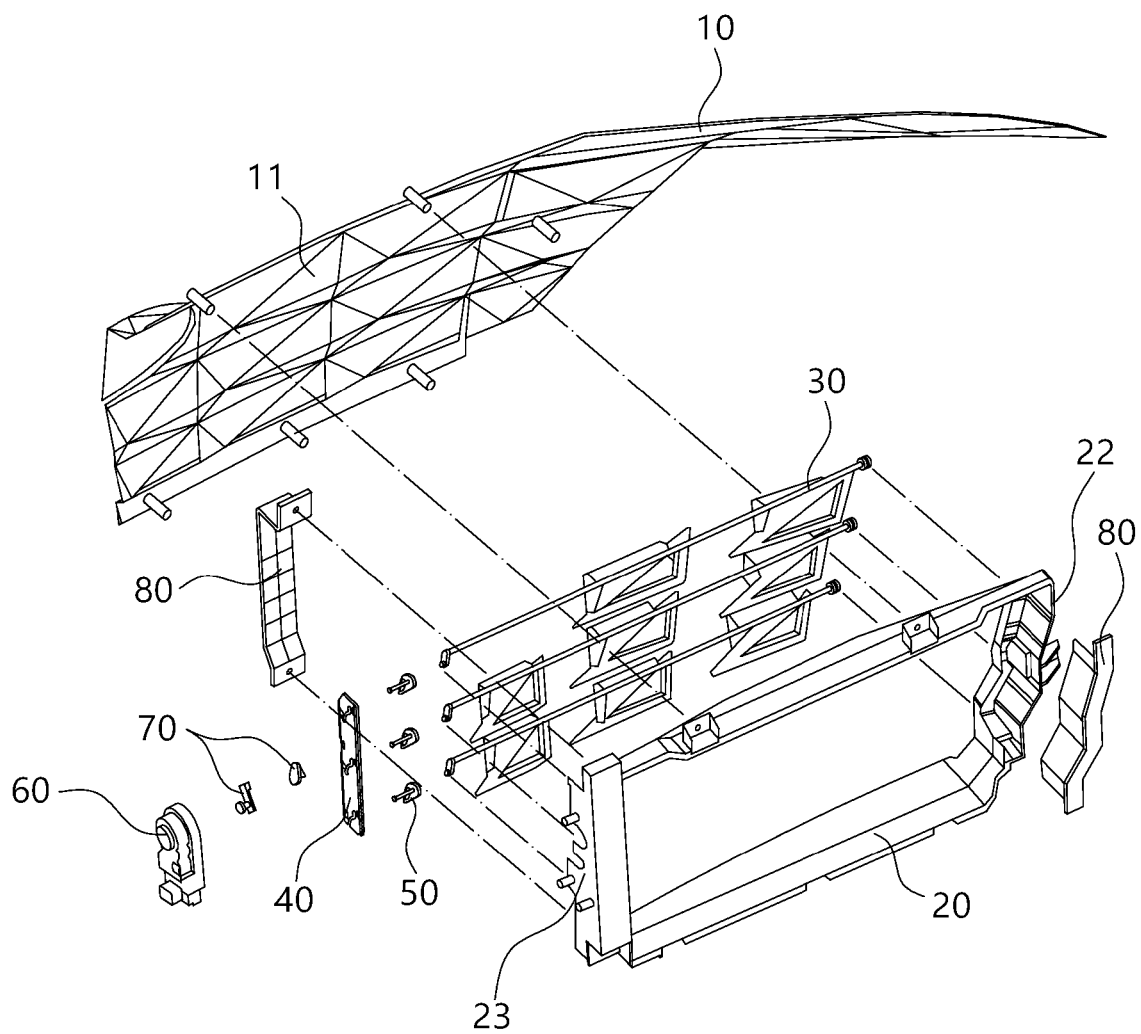
FIG. 1 is an exploded perspective view illustrating an active air flap system according to an embodiment of the present disclosure.

The drawings described herein are for illustration purposes only and are not intended to limit the scope of the present disclosure in any way.

DESCRIPTION OF SPECIFIC EMBODIMENTS

Hereinafter, some embodiments of the present disclosure are described in detail with reference to the accompanying drawings. In adding reference numerals to the components of respective drawings, it should be noted that the same components are given the same reference numerals as much as possible even though they are indicated on different drawings. In addition, in describing embodiments of the present disclosure, if it is determined that relevant known configurations or functions interfere with the understanding of the embodiments of the present disclosure, a detailed description thereof is omitted. In this process, the thickness of the lines or the size of the components illustrated in the drawings may be exaggerated for clarity and convenience of explanation. In addition, the terms to be described below are terms defined in consideration of functions in the present disclosure, so the definition may vary according to user's or operator's intentions or practices. Therefore, definitions of these terms should be made based on the content throughout the present disclosure.

FIGS. 11A and 11B illustrate the basic structure of a conventional active air flap system in the related art, and FIG. 12 illustrates the opening/closing operation of the conventional active air flap system. According to the illustration of FIGS. 11A and 11B, a plurality of flaps 2 each have a rotation shaft 2a, one end of which is rotatably connected to a housing 3. Accordingly, the flap 2 is provided such that the flap can rotate only about the rotation shaft 2a with respect to the housing 3. A linkage 4 is fixed to the other end of the rotation shaft 2a, and a guide pin is formed to protrude from the linkage 4 as an operating shaft 4a.

Further, as illustrated in FIG. 12, slide holes corresponding to the plurality of flaps 2 are formed in a link 5, and the guide pin, which is the operating shaft 4a, can move only along a path of the slide hole.

Referring to FIG. 12, when the link 5 moves in a vertical direction, the operating shaft 4a linearly reciprocates along the path of the slide hole, and accordingly, the plurality of flaps 2 rotate around the respective rotation shaft 2a.

FIG. 8A is a view illustrating a problem of an active air flap having the structure in the related art as being applied to a vehicle.

Referring to FIG. 8A, in the case of the active air flap having the structure, a rotation shaft 2a is within an operating range D of the operating shaft 4a (that is, the widthwise length of the slide hole formed in the link 5), and a flap 2 operates within the operating range D about the rotation axis 2a. In this case, a front end of the link 5 for driving the flap 2 is located in front of the flap 2, so that it becomes difficult to change a design about the position of the link 5 in the vehicle front-rear direction.

On the other hand, in order to prevent design heterogeneity and air resistance due to the creation of space between the flap and the radiator grill, it is desired to closely attach the flap to the grill so that the surface of the flap is flush with the surface of the grill.

However, as described above, according to the structure of the active air flap in the related art, since the front end of the link 5 for driving the flap 2 is positioned to protrude forward from the flap 2, the extent to which the flap can attach to the grill is very limited. Accordingly, it becomes impossible to bring the flap into close contact with the grill so that the surface of the flap is flush with the grill.

In addition, there is a case in which a bumper skin surface is configured to be greatly inclined downward in consideration of running resistance or design aspects. However, according to the structure of the active air flap disclosed in the related art, the front end of the link 5 for driving the flap 2 is located in front of the flap 2. Thus, depending on the size of a radius R1 of rotation of a flap axis which is a distance between the rotation shaft 2a of the flap 2 and the operating shaft 4a, as illustrated in FIG. 8A, a front upper end of the link 5 invades and interferes with the bumper skin surface. Thus, since the interference between the link 5 and the bumper skin surface varies according to the curvature of the vehicle exterior design, there is a problem in that a vehicle design or a design of the mechanical portion is greatly limited.

Further, when the radius R1 of rotation of the flap axis is reduced in order to solve this problem, the maximum rotation amount of the flap 2 is reduced. Therefore, in this case, when the flap 2 is opened, the opening area is reduced, and the cooling performance is deteriorated.

FIG. 1 is an exploded perspective view illustrating an active air flap system according to an embodiment of the present disclosure, FIGS. 2A to 2D are enlarged views respectively illustrating components of a mechanism constituting the active air flap system of FIG. 1, and FIG. 3 illustrates a mounting structure of a flap 30, a flap linkage 32, a second link 50, a first link 40, loader portions 71 and 72, and an actuator 60.

Figure 2A:
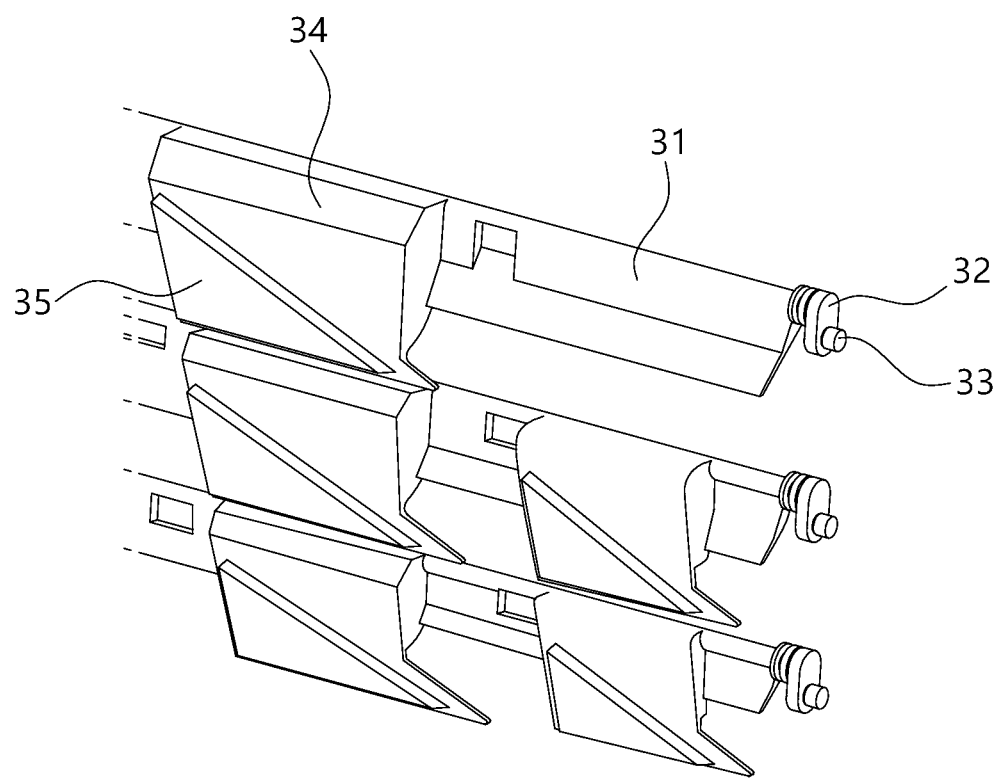
FIG. 2A is a partially enlarged view illustrating a flap 30 constituting an active air flap system according to an embodiment of the present disclosure.
Figure 2B:
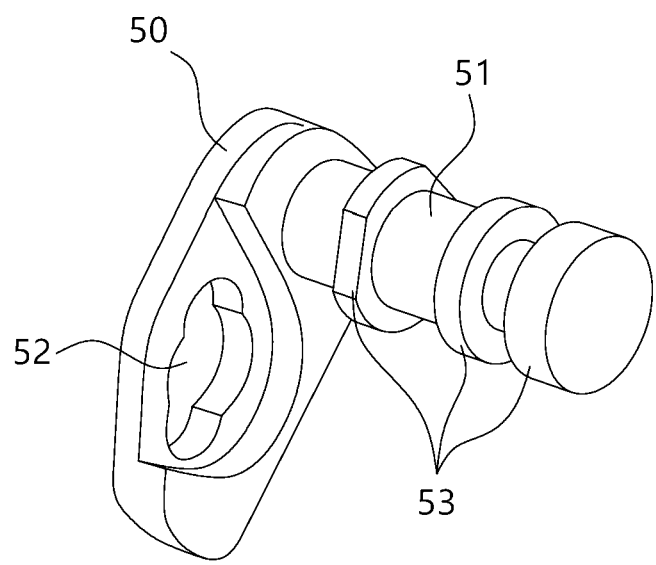
FIG. 2B is a perspective view illustrating a second link 50 constituting an active air flap system according to an embodiment of the present disclosure.
Figure 2C:
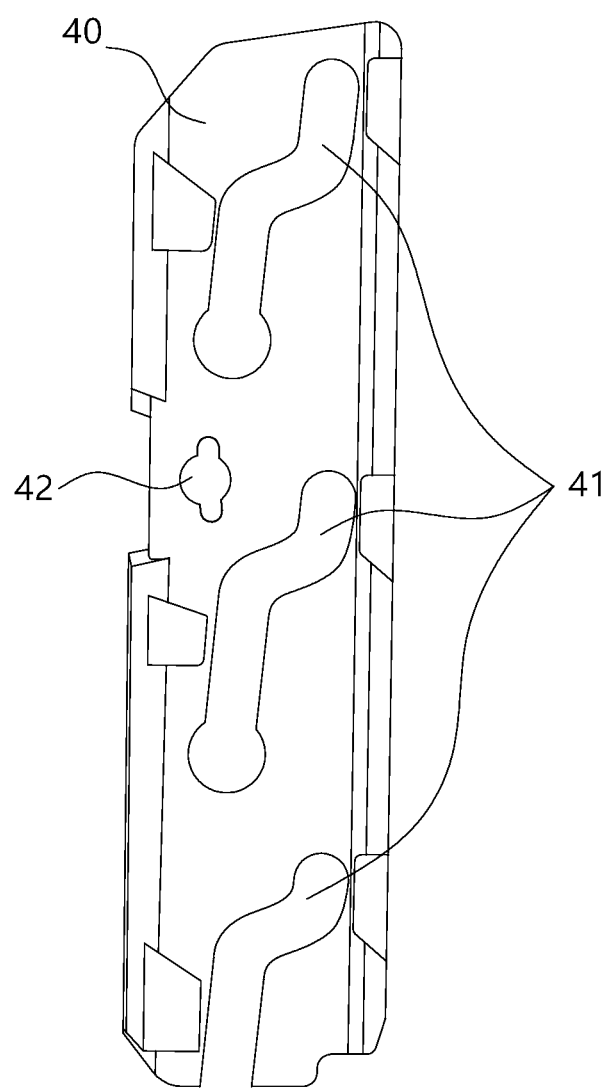
FIG. 2C is a plan view illustrating a first link 40 constituting an active air flap system according to an embodiment of the present disclosure.
Figure 2D:
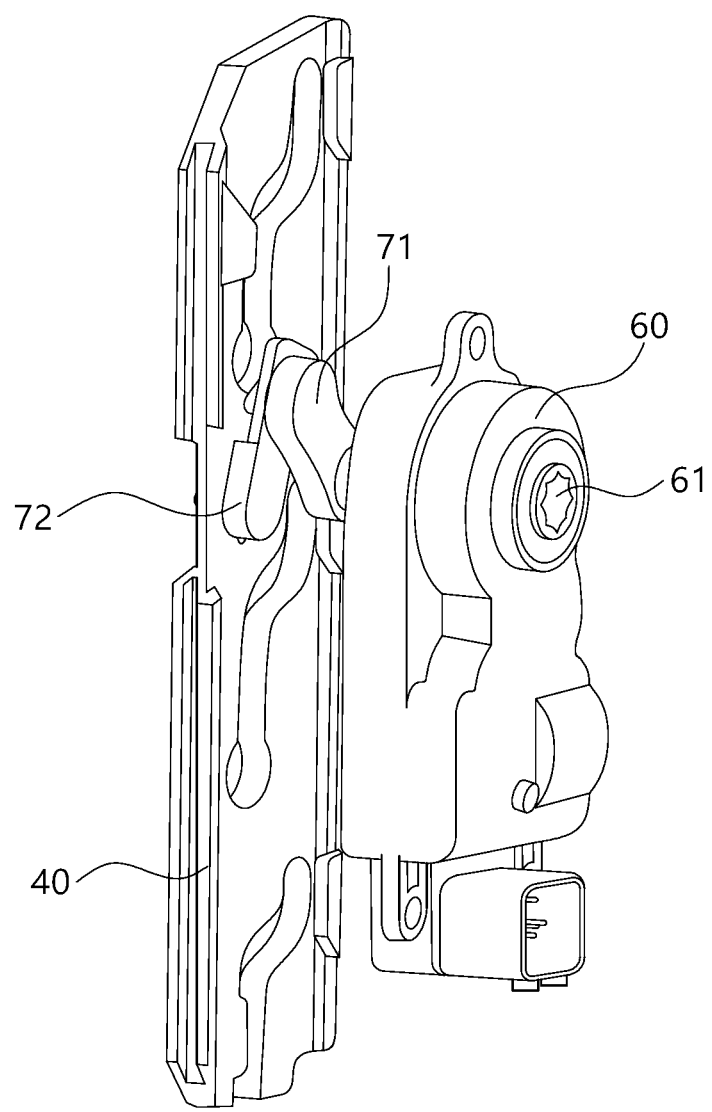
FIG. 2D is a perspective view illustrating a state in which an actuator 60 and loader portions 71 and 72 of an active air flap system are mounted on a first link 40 according to an embodiment of the present disclosure.

Referring to FIGS. 1 to 2D, as an embodiment of the present disclosure, the active air flap system includes an exterior surface 10, a housing 20, flaps 30, and a driving section 40, 50, 60, 70 for driving the flaps 30.

The exterior surface 10 is disposed on a front side of a vehicle and has a shape extending in a vehicle width direction. In one embodiment, the exterior surface 10 may be a grill formed on the front side of a vehicle. In one form, the grill 10 may have a linear shape or an arc shape curved with a predetermined curvature as viewed from the lateral side according to the design concept of a vehicle. A plurality of openings 11 are formed through the grill 10 along the vehicle width direction and the vehicle height direction. The openings 11 function as inlets through which external air passes through the grill 10 when a vehicle is driving, and the external air passing through the openings 11 cools an internal combustion engine, an electric motor, a heat exchanger, etc. mounted inside of a vehicle. The grill 10 may be provided on a front side of a bumper housing, or may be provided on a front side of a vehicle body above a bumper to form a skin surface of a foremost side of a vehicle.

In one embodiment, the housing 20 may be mounted on the rear side of the grill 10, as illustrated in FIG. 1. The housing 20 functions to support the flap 30 to be described below as well as to define a space for guiding the external air having passed through the opening 11 of the grill 10 to the front interior space located on the front side of a vehicle.

The housing 20 includes a front portion having an opening therethrough, and lateral wall portions 22 and 23 extending rearward from both widthwise edges of the front portion in a vehicle front-rear direction. As illustrated in FIG. 1, the front portion of the housing 20 is mounted on a rear side of the grill 10 such that the opening of the housing 20 communicates with the openings of the grill 10. The lateral wall portion 22 of the housing 20 is provided with a hole into which one end of a rotation shaft member 31 of the flap 30 is inserted. In addition, the other lateral wall portion 23 of the housing 20 may be configured as a "U"-shaped double partition wall including a first partition wall 23a, a second partition wall 23b, and an internal space therebetween. Accordingly, the first link 40, the second link 50, and the loader 70, which constitute a mechanism portion, may be accommodated in the front internal space between the first partition wall 23a and the second partition wall 23b.

The flap 30 is rotatably mounted with respect to the housing 20. The flap 30 has a function of adjusting the amount of air flowing into the vehicle front side through the opening 11 of the grill 10 by opening and closing the opening 11 communicating with the opening of the housing 20. For example, the flap 30 closes the opening 11 of the grill 10 to reduce air resistance when a vehicle is traveling at high speed. On the other hand, when it is required to increase the cooling efficiency of the internal combustion engine, electric motor, heat exchanger, etc. accommodated in the vehicle-front side space, the flap opens the opening 11 of the grill 10.

As illustrated in FIGS. 1 and 2A, the flap 30 is provided with a plurality of rotation shaft members 31 extending in a vehicle width direction and arranged in a vehicle vertical direction, and a plurality of flap members 34 provided on the respective rotation shaft member 31 in the longitudinal direction of the respective rotation shaft member 31. One end of the rotating shaft member 31 is inserted into a groove provided in one lateral wall portion 22 of the housing 20. Accordingly, the flap 30 is held by the housing 20 so as to rotate about the center of the rotation shaft member 31 as a rotation axis.

Figure 9A:
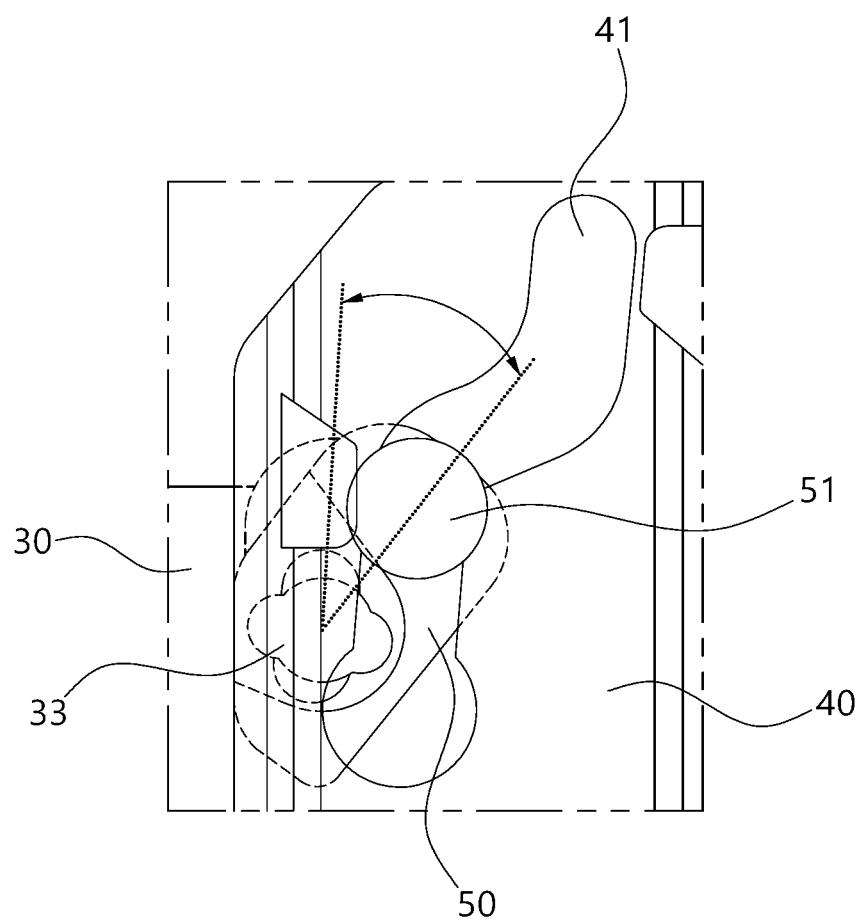
FIG. 9A is a partially enlarged view illustrating a guide hole in a state in which a flap is closed in an active air flap system according to an embodiment of the present disclosure.
Figure 9B:
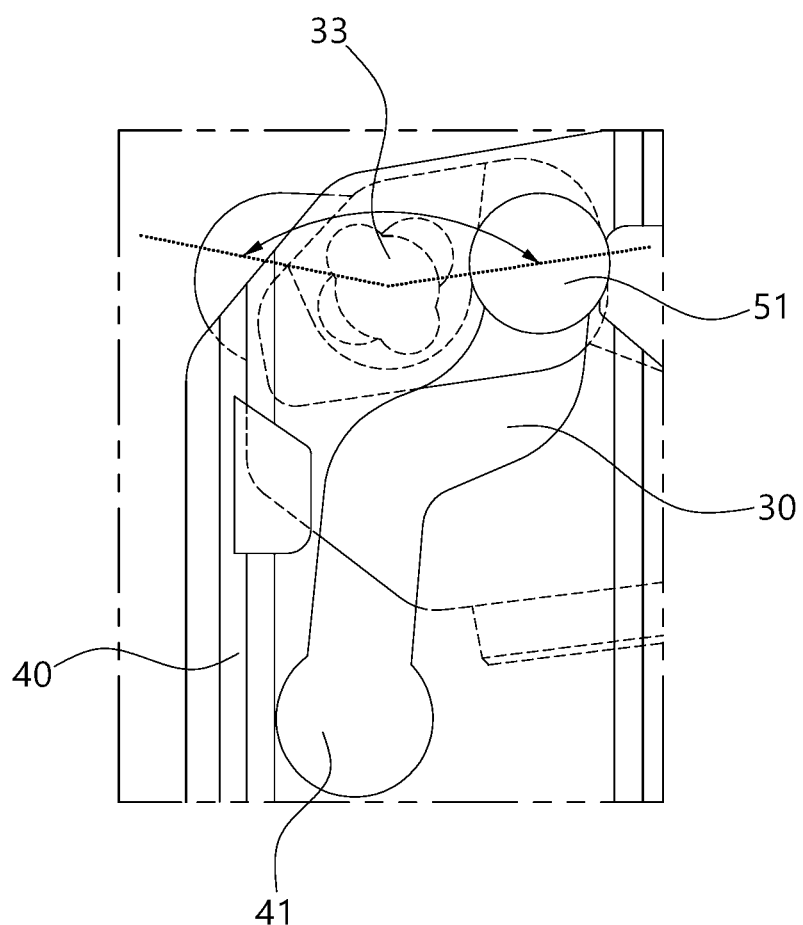
FIG. 9B is a partially enlarged view illustrating a guide hole in a state in which a flap is opened in an active air flap system according to an embodiment of the present disclosure.

One end of the flap linkage 32 is connected to the other end of the plurality of rotation shaft members 31. The flap linkage 32 has an arm shape extending in a longitudinal direction perpendicular to an axial direction of the rotation shaft member 31, and one end of the flap linkage 32 is fixed to the other end of the rotation shaft member 31 so as not to move relatively. Accordingly, when the flap linkage 32 rotates, the rotation shaft member 31 is also configured to rotate integrally around the rotation shaft member 31 accordingly. On the other end of the flap linkage 32 in the longitudinal direction, a connection pin 33 is formed to protrude in a direction perpendicular to the longitudinal direction. The connection pin 33 is rotatably connected to a connection hole 52 provided on the other end of the second link 50 to be described later. In one embodiment, the connection pin 33 has a holding portion protruding around an outer periphery of the protruding end of the connection pin 33, as illustrated in FIGS. 2A, 9A and 9B. The holding portion performs a function of holding the connection pin 33 in the connection hole 52, as described below.

Each flap member 34 is maintained in a suspended form, for example, on the rotation shaft member 31 so as to correspond to the opening 11 of the grill 10. As illustrated in FIG. 2A, a protrusion 35 is formed on the front side of the flap member 34 to protrude forward from the vehicle front-rear direction. In one form, as viewed from the front, the shape and dimension of the protrusion 35 are the same as those of the opening 11 of the grill 10. In addition, as viewed from the side with vents of the grill 10 closed by the flap 30, the dimension of the protrusion 35 is set such that the front side of the protrusion 35 is flush with the outer surface of the grill 10. In this case, as viewed from the outside of a vehicle, the grill 10 and the flap 30 may form the same skin line without forming a step, thereby improving aesthetics.

In addition, a sealing member (not shown) may be provided along an edge of the protrusion 35. The sealing member may be made of any one selected from a resin-based material and a hard rubber-based material. As described above, as viewed from the front, the shape and dimension of the protrusion 35 are the same as those of the vent of the grill 10. However, a gap may be formed between the protrusion 35 of the flap 30 and the vent of the grill 10 due to a processing error, so external air may be introduced through the gap. Therefore, the sealing member serves to seal the opening 11 of the grill 10 during the closed state of the flap 30 so as to prevent air from being introduced through a gap created, due to a processing error or the like, between the protrusion 35 of the flap 30 and the opening 11 of the grill 10.

FIG. 2B is a partially enlarged view illustrating a second link 50 constituting the mechanism of the active air flap system.

The second link 50 may be an arm-shaped member extending long in the longitudinal direction. As described above, one longitudinal end of the second link is provided with a connection hole 52 into which the connection pin 33 of the flap linkage 32 is inserted. As illustrated in FIG. 2B, the connection hole 52 is circumferentially provided with a protrusion hole into which a holding portion protruding from the outer periphery of the connection pin 33 can be inserted, and a recess is formed along the periphery of the connection hole 52. Therefore, when the connection pin 33 is rotated in a state in which the holding portion of the connection pin 33 passes through the protrusion hole of the connection hole 52, the holding portion becomes caught in the recess, so that the coupled state between the connection pin 33 and the connection hole 52 can be stably maintained.

A guide pin 51 is provided at the other end of the second link 50 in a direction perpendicular to the longitudinal direction of the second link 50. The guide pin 51 is inserted into a first guide hole 41 of the first link 40. Therefore, as described below, when the first link 40 receives power from the actuator 60 through a loader 70 so as to linearly reciprocate in the vertical direction, the other end of the second link 50 linearly reciprocates along a path of the guide hole 41 in the horizontal direction. On the other hand, the other end of the second link 50 is rotatably connected to the other end of the flap linkage 32, and one end of the flap linkage 32 is rotatably connected to the housing 20 through the rotation shaft member 31. Accordingly, when the other end of the second link 50 linearly reciprocates in the horizontal direction along the path of the guide hole 41, one end of the second link 50 rotates around the other end of the second link 50.

As illustrated in FIG. 2B, the guide pin 51 is circumferentially provided with three holding portions 53 extending in an annular shape along the outer peripheral surface of the guide pin 51 in the longitudinal direction. A portion of the guide pin 51 between a first holding portion on the end side of the guide pin 51 and a second holding portion thereafter is supported by a second guide hole 21 formed on the second partition wall 23b of the housing portion 20. Further, a portion of the guide pin 51 between the second holding portion and the next third holding portion is held in the first guide hole 41 of the first link 40. A radial width of the holding portions 53 is greater than a widthwise length of the first guide hole 41 and the second guide hole 21. Accordingly, the holding portions can prevent the guide pin 51 from moving in the axial direction or from falling off from the first link 40 or the housing 20 when the mechanism is operated.

FIG. 2C is a partially enlarged view illustrating a first link 40 constituting the mechanism of the active air flap system. As illustrated in FIG. 2C, the first link 40 may have a plate shape extending long in a vertical direction.

A plurality of first guide holes 41 is formed in the longitudinal direction of the first link 40. As described above, the guide pin 51 of the second link 50 is inserted into the first guide hole 41, so that as the first link 40 moves in a vertical direction, the guide pin 51 moves along the path of the first guide hole 41.

Figure 5:
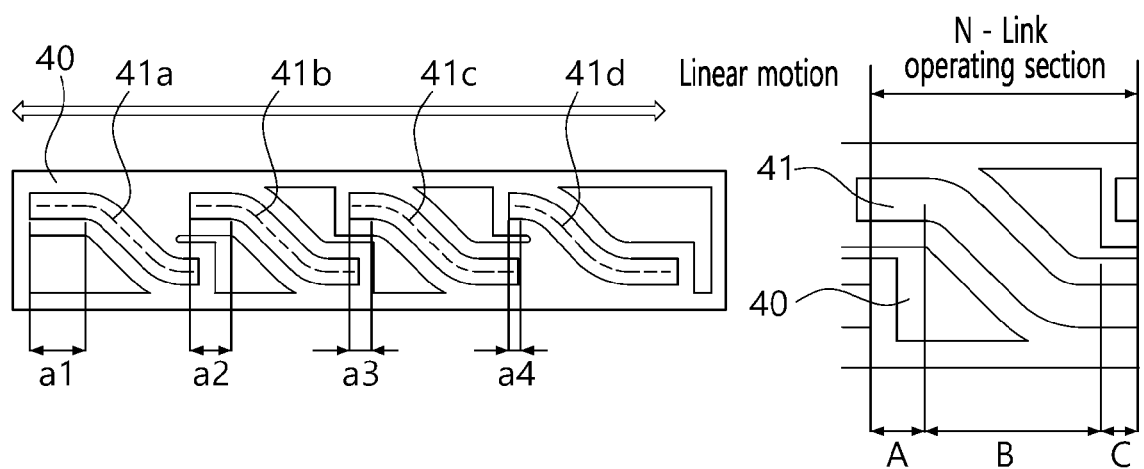
FIG. 5 is a view illustrating the shape of guide holes 41a to 41d formed in a first link 40 of an active air flap system according to an embodiment of the present disclosure.

FIG. 5 illustrates specific shapes of the first guide holes 41a to 41d formed in the first link 40.

As viewed from a lateral side, each of the first guide holes 41a to 41d has a first straight portion A extending in a vertical direction, and an inclined portion B continuously extending from the first straight portion A and further extending in a direction inclined with respect to the extension direction of the first straight portion A. In another embodiment, as illustrated in FIG. 5, the first guide hole may further include a second straight portion C extending in a vertical direction from the inclined portion B in the same manner as the first straight portion A.

In the example illustrated in FIG. 5, the distance obtained by adding the lengths in the vertical direction of the first straight portion A, the inclined portion B, and the second straight portion C is an operation section N in which the first link 40 is operated in the vertical direction by the actuator 60. Meanwhile, as described above, the guide pin 51 of the second link 50 is inserted into the first guide hole 41, so that as the first link 40 moves in the vertical direction, the guide pin 51 moves along the path of the first guide hole 41. Thus, when the first link 40 starts moving downward, the guide pin 51 of the second link 50 maintains its original position until the first link 40 moves down by the vertical length of the first straight portion A, and then moves linearly in the front-rear direction during downward movement of the first link 40 by the vertical length of the inclined portion B, from the moment when the guide pin 51 reaches the front end of the inclined portion B. Then, when the guide pin 51 reaches the rear end of the inclined portion B, the guide pin 51 stops moving in the linear direction.

As described above, since the guide pin 51 starts moving from the point when the guide pin 51 reaches the inclined portion (that is, the point at which the guide pin 51 reaches the rear end of the first straight portion A), it is possible to differently set the rotation starting time point and the opening amount at a specific time point of the respective flaps 30 and if the first straight portions A of the first guide holes 41a to 41d corresponding to the guide pins 51 of the respective flaps 30 vary differently.

For example, as illustrated in FIG. 5, if the lengths a1, a2, a3, a4 of the first straight portions are made shorter in the order from the lowest first guide hole 41a to the highest first guide hole 41d, the flap 30 connected to the highest first guide hole 41d with the shortest length a4 is rotated first, and then the flap 30 connected to the first guide hole 41c is opened, and so on.

However, because the guide pins 51 of the plurality of second links 50 are driven by one first link 40, the vertical lengths of respective first guide holes 41a, 41b, 41c, 41d should be the same. Further, in order to make the maximum opening amount of the plurality of flaps 30 equal to each other, the inclined portion B needs to have the same shape. Accordingly, the opening amount of respective flap 30 upon the sequential driving and at a specific time can be made differently by setting the whole lengths (i.e., the operation sections N) of respective first guide holes 41 and the vertical length of the inclined portion B to be identical and setting the first straight portion A and the second straight portion C to have different lengths.

As illustrated in FIG. 2C, a connection hole 42 is formed on one side of the first link 40 in the width direction for rotatable connection with the loader 70. As described below, a connection pin of a second loader portion 72 is inserted into the connection hole 42 to rotatably connect the second loader portion 72 of the loader 70 and the first link 40.

In addition, as illustrated in FIG. 2C, when the first link 40 is viewed from the side, an upper front edge portion may have a tapered shape. In this case, even in the case where the curvature of a bumper screen surface is large, when the first link 40 moves upward in order to move the flap 30 in an open state, interference between the upper front edge portion of the first link 40 and the bumper screen may be relatively suppressed.

FIG. 2D illustrates an actuator 60 and loader portions 71 and 72 as a structure for generating and transmitting power to the first link 40.

The actuator 60 performs a function of generating a driving force to rotate the flap 30. The actuator 60 may be an electric motor that rotates an output end 61 using power from a vehicle, or a hydraulic mechanism that rotates an output end 61 using hydraulic pressure from a hydraulic supply of a vehicle.

The loader 70 is a power transmission mechanism that transmits the rotational power generated by the actuator 60 to the first link 40 so that the first link 40 performs a vertical linear reciprocating motion. In the example illustrated in FIG. 2D, the loader 70 includes a first loader portion 71 and a second loader portion 72. The first loader portion 71 is configured such that an input end protruding from one longitudinal end is engaged with the output end 61 of the actuator 60. In addition, the other end of the first loader portion 71 is rotatably connected to one end of the second loader portion 72. Further, a connection pin 73 protruding from the other end of the second loader portion 72 is inserted into the connection hole 42 of the first link 40 so as to rotatably connect the other end of the second loader portion 72 and the first link 40.

When the output end 61 of the actuator 60 rotates, the first loader portion 71 rotates around one end engaged with the output end 61. Accordingly, as the second loader portion 72 rotatably connected to the first loader portion 71 moves, the other end of the second loader portion 72 applies a force to the first link 40. As a result, according to the rotation direction of the output end 61 of the actuator 60, the first link 40 is able to move linearly in the vertical direction.

Figure 4:
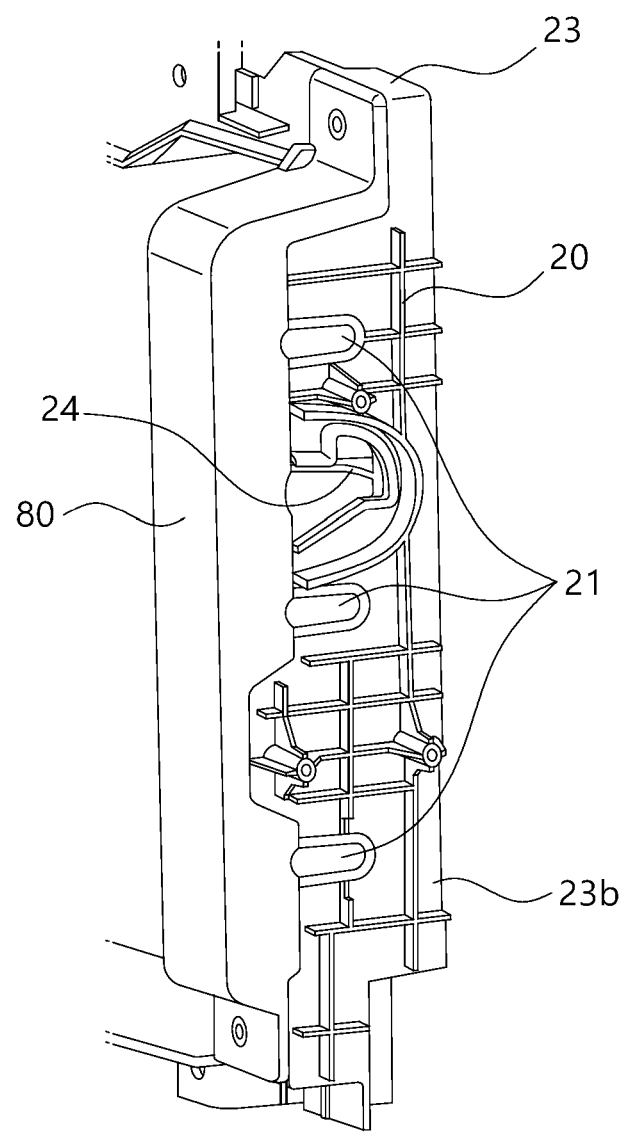
FIG. 4 is a partially enlarged view illustrating a housing 20 of an active air flap system according to an embodiment of the present disclosure.

FIG. 4 is an enlarged view of the other lateral wall portion 23 of the housing 20. Although not illustrated in FIG. 4, as described above, the other lateral wall portion 23 of the housing 20 accommodates the flap linkage 32, the first link 40, the second link 50, and the loader 70 as illustrated in FIG. 3, and the actuator 60 is provided outside of the housing 20 so that its output end 61 is connected to the input end of the first loader portion 71 in the housing 20 through the opening 24 formed in the housing 20.

In addition, as illustrated in FIG. 4, the second guide hole 21 extending in the width direction is provided in the housing 20 as many as the number of the guide pins 51. In this case, the tip of the guide pin 51 that has passed through the first guide hole 41 of the first link 40 may be inserted through the second guide hole 41. In this case, when the first link 40 moves in the vertical direction, the second guide hole 41 can guide the guide pin 51 to securely move linearly in the width direction (vehicle front-rear direction).

As illustrated in FIG. 4, the active air flap system may include a cover 80. In this case, the second guide hole 21 and the opening provided in the housing 20 have an open end in which the rear end in the vehicle front-rear direction is opened as illustrated in FIG. 4. The cover 80 serves to cover the open end to form a closed end.

According to the above structure, if the guide pin 51 is first pushed through the open end of the second guide hole 51 and then is covered with the cover 80, the guide pin 51 may be maintained in a state of being inserted into the second guide hole 21 in a simple way. Two covers 80 may be provided on both lateral wall portions 22 and 23 of the housing 20, respectively, and may be fixed to the housing 20 using screws or the like.

Meanwhile, as illustrated in FIG. 4, the second guide hole 21 may extend from the housing 20 to the cover 80. That is, a portion of the second guide hole 21 may be formed in the cover 80 as well. In this case, even when the cover 80 is added to the housing 20, it is possible to suppress an increase in the widthwise dimension of the system, thereby making the entire system compacted.

Hereinafter, a specific operation aspect of the active air flap according to an embodiment of the present disclosure is described with reference to FIGS. 6 and 7.

First, when the output end 61 rotates counterclockwise using the power generated by the actuator 60, the first loader unit 71 rotates around one end engaged with the output end 61. Accordingly, as the second loader portion 72 rotatably connected to the first loader portion 71 moves, the other end of the second loader portion 72 applies a downward force to the first link 40. As a result, the first link 40 is linearly moved downward.

When the first link 40 starts performing a downward linear motion, the guide pins 51 connected to the first guide holes 41*a*, 41*b*, and 41*c* of the first link 40 maintains their original position until they reach the inclined portions B of the first guide holes 41*a*, 41*b*, and 41*c*. However, when the first link 40 linearly moves further downward and the guide pins 51 reach the inclined portions B of the first guide holes 41*a*, 41*b*, and 41*c*, the guide pins 51 starts moving linearly. On the other hand, if the lengths of the first straight portions A of the first guide holes 41*a*, 41*b*, and 41*c* are different from each other, the time points at which the guide pins 51 start moving linearly are also different.

The other end of the second link 50 is rotatably connected to the other end of the flap linkage 32, and one end of the flap linkage 32 is rotatably connected to the housing 20 through the rotation shaft member 31. Accordingly, when the other end of the second link 50 linearly reciprocates in the horizontal direction along the path of the guide hole 41, one end of the second link 50 rotates around the other end of the second link 50. In addition, as the other end of the second link 50 rotates, the flap linkage 32 rotatably connected to one end of the second link 50 also rotates about the rotation shaft member 31. As a result, the rotation shaft member 31 fixed to one end of the flap linkage 32 rotates so that the flap 30 rotates.

Figure 6:
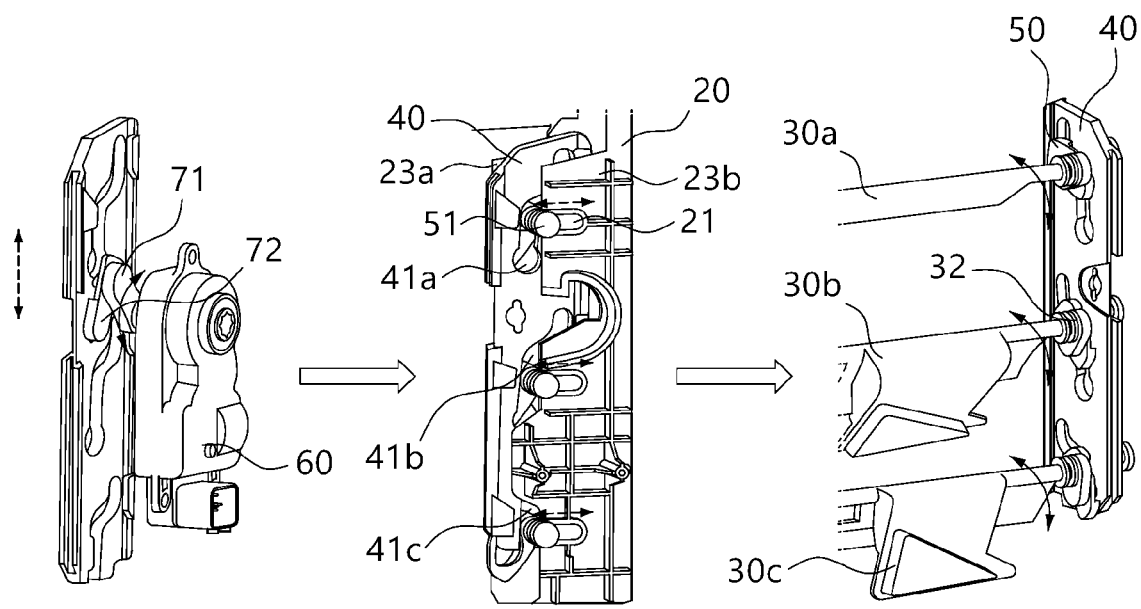
FIGS. 6 and 7 are views illustrating a flap driving method using an active air flap system according to an embodiment of the present disclosure.
Figure 7:
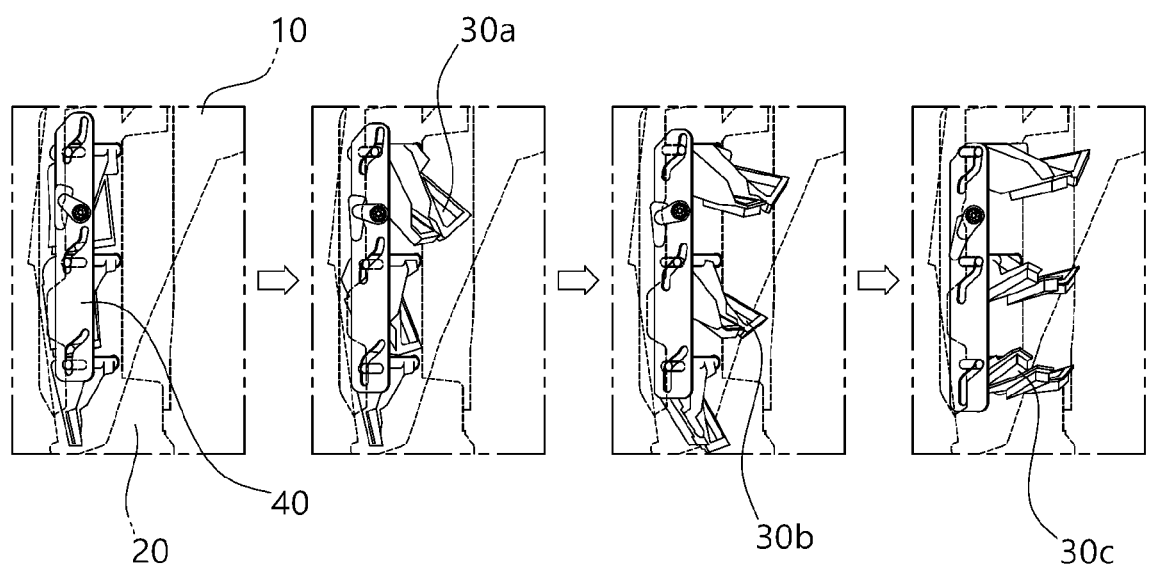

On the other hand, as a result of varying the lengths of the straight portions of the first guide holes 41*a*, 41*b* and 41*c* to which the guide pins 51 of the respective flaps 30*a*, 30*b*, 30*c* are connected, as illustrated in FIGS. 6 and 7, it can be seen that the flap 30*a* starts rotating first, and the flaps 30*b* and 30*c* are sequentially opened in that order.

Unlike the structure of the active air flap in the related art illustrated in FIG. 8, for example, in which the linkage 4 is directly inserted into the slide hole of the link 5, as described above, the present disclosure employs a double link structure in which a second link 50 is further provided between the first link 40 and the flap linkage 32.

Figure 8B:
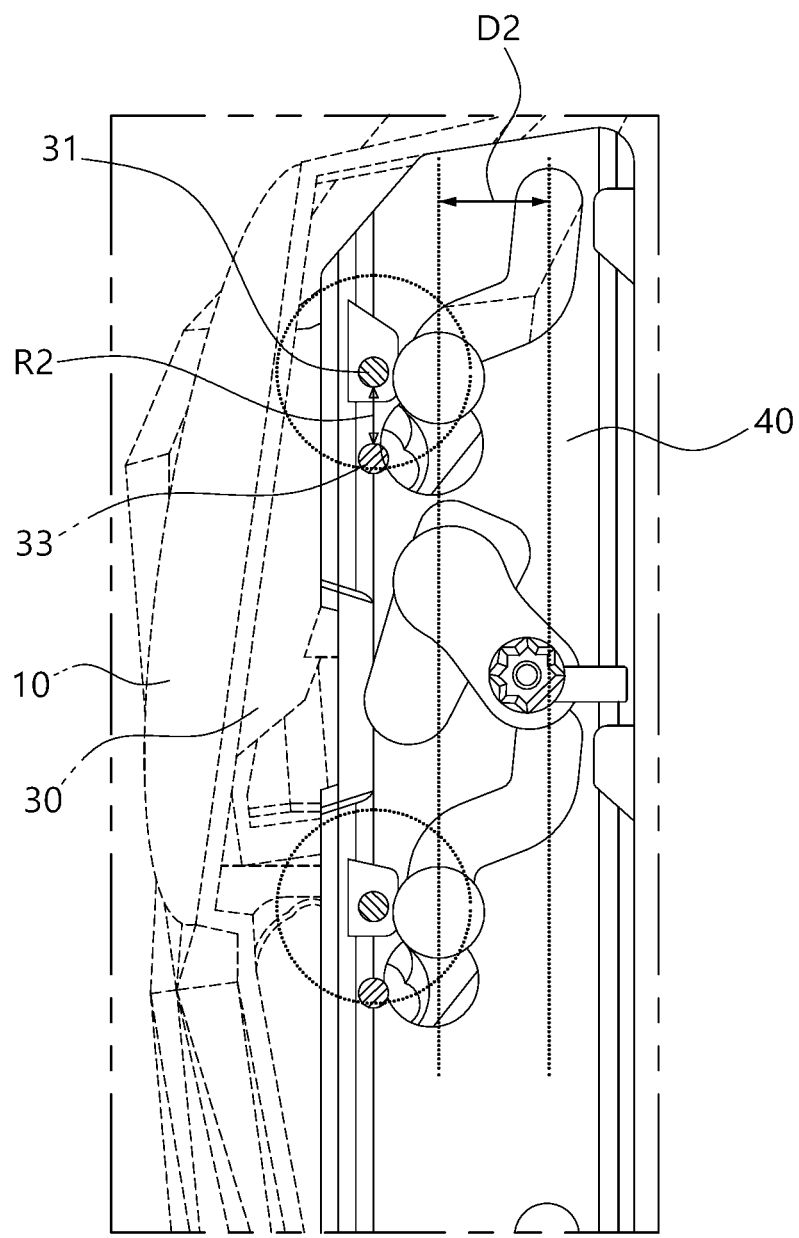
FIG. 8B is a side view illustrating a mechanism of an active air flap system according to an embodiment of the present disclosure.

In this case, as illustrated in FIGS. 8B, 9A and 9B, when the guide pin 51 moves according to the movement of the first link 40, it is possible to increase a change in angle between the rotation shaft (rotation shaft member 31), the operating shaft (connection pin 33) and the guide pin 51, so that even when the flap side rotation radius R2 between the rotation shaft and the operating shaft is short, sufficient opening amount of the flap 30 can be secured.

That is, due to the addition of the second link 50, it is possible to relatively shorten the flap side rotation radius R2 and the flap operating section D2 compared to the related art illustrated in FIG. 8A, and the flap operating section D2 can be placed behind the rotation shaft (rotation shaft member 31), so that it is possible to shift the first link 40 toward the rear side in the vehicle front-rear direction. Accordingly, even in the case of a vehicle having a bumper design with a large curvature, it is possible to avoid interference between the bumper skin surface and the mechanism of the active air flap while increasing the rotation angle of the flap.

In addition, since it is possible to shift the position of the first link 40 in the vehicle front-rear direction by the length of the second link 50, by design changing the length of the second link 50 when the bumper design is changed, it is possible to simply change the design so as to avoid interference between the bump skin surface and the mechanism of the active air flap.

In addition, according to the lengths of the first straight portions A of the plurality of first guide holes 41*a*, 41*b*, 41*c*, 41*d* provided in the first link 40, the sequential operation timing for each flap can be different. In addition, the rotation angle of the flap 30 may be determined according to the shapes of the first guide holes 41*a*, 41*b*, 41*c*, and 41*d*. That is, it is possible to secure a wide degree of freedom in design by appropriately adjusting these design factors in consideration of the necessary aerodynamic force, cooling performance, and the limiting factors of the installation space of the mechanism.

In another embodiment, the active air flap system may further include a controller for controlling the actuator 60. Here, the controller receives a signal related to at least one of vehicle speed, ambient temperature, refrigerant pressure, and coolant temperature from sensors mounted on a vehicle, and transmits a predetermined duty signal to the actuator 60 to control the degree of opening and closing of the flap on the basis of the input signals. For example, as illustrated in FIG. 10, as the vehicle speed increases, the controller controls the actuator 60 to close the flap 30 in order to secure aerodynamic performance. In addition, when the required level of cooling increases, such as when the coolant temperature is high, the controller controls the actuator 60 to open the flap 30 in order to quickly cool the internal combustion engine or motor provided inside of a vehicle. In addition, the controller, as illustrated in FIG. 10, weights respective variables affecting the aerodynamic performance and cooling performance, and may control the actuator 60 according to the result of combining respective variables.

In addition, as described above, in the active air flap system according to the present disclosure, it is possible to set the opening amount of respective flaps 30 differently from each other at the rotation timing and a specific timing point of the respective flaps 30. Accordingly, as illustrated in FIG. 10, it is also possible to adjust the opening amount of the flap 30 in more detail. For example, the controller may transmit an operation signal to the actuator 60 so that only the upper two flaps are opened by a predetermined opening amount in a state in which the lower two flaps are closed among the four flaps 30 in the vertical direction. Accordingly, it is also possible for the controller to determine the number of flaps to be opened and the amount of flaps to be opened at that time in consideration of the required aerodynamic force and cooling performance, and to transmit an operation signal to the actuator 60 accordingly.

The controller may be implemented in the form of a computer provided in a vehicle. In this case, the program for realizing this control function may be recorded on a computer-readable recording medium, and the program recorded on the recording medium may be read into a computer system and executed. In addition, the "computer system" referred to herein is a computer system incorporated in a vehicle, and includes an OS or a hardware such as peripheral devices. In addition, a "computer-readable recording medium" refers to a storage device including a portable medium such as a flexible disk, a magneto-optical disk, a ROM, and a CD-ROM, a hard disk incorporated in a computer system, or the like. In addition, "computer-readable recording medium" may include holding a program in a short time and dynamically like a communication line in the case of transmitting a program through a network such as the Internet or a communication line such as a telephone line, and in that case, holding a program for a certain period of time like a volatile memory inside of a computer system forming a server or a client. Further, the program may be for realizing a portion of the above-described functions, or may be one that can realize the above-mentioned functions in combination with a program already recorded in the computer system.

While the present disclosure has been described with reference to the embodiment illustrated in the drawings, this is merely exemplary, and it is understood by those of ordinary skill in the art that various modifications and equivalent other embodiments are possible from the disclosed embodiment.

What is claimed is:

1. An active air flap system for a vehicle, the active air flap system comprising:
   an exterior surface disposed on a vehicle front side and having at least one opening through which external air is supplied into a vehicle interior;
   a housing provided on a rear side of the exterior surface in a front-rear direction of the vehicle;
   a plurality of flaps rotatably mounted on the housing and configured to open and close the at least one opening; and
   a driving section configured to rotate the plurality of flaps to open and close the at least one opening,
   wherein the driving section includes:
      a first link configured to linearly reciprocate within the housing and having a plurality of first guide holes corresponding to the plurality of flaps, respectively;
      a plurality of second links having first ends guided by the respective first guide holes of the first link and second ends; and
      a plurality of flap linkages having first ends and second ends, wherein the first ends of the plurality of flap linkages are rotatably connected to the second ends of the plurality of second links, respectively, and the second ends of the plurality of flap linkages are connected to the plurality of flaps, respectively,
      wherein a guide pin is formed to protrude from the first end of the second link so as to be inserted into the first guide hole, and the housing is further provided with a second guide hole, through which the guide pin is inserted through the first guide hole, to guide a reciprocating linear motion of the guide pin.

2. The active air flap system of claim 1, wherein the plurality of first guide holes are formed to have different shapes so that flaps of the plurality of flaps rotate with a time difference from each other with a linear reciprocating movement of the first link.

3. The active air flap system of claim 2, wherein the plurality of first guide holes each include:
   a first straight portion extending in a first direction; and
   an inclined portion extending from the first straight portion in a direction inclined with respect to the first direction.

4. The active air flap system of claim 3, wherein first guide holes among the plurality of first guide holes each include the first straight portion and the inclined portion, and an entire length of the respective first guide holes in the first direction are the same while lengths of the respective first straight portions are different from each other.

5. The active air flap system of claim 3, wherein the plurality of first guide holes each further includes a second straight portion extending from the inclined portion in the first direction.

6. The active air flap system of claim 5, wherein first guide holes among the plurality of first guide holes each include the first straight portion, the inclined portion, and the second straight portion, and an entire length of the respective first guide holes are the same in the first direction while lengths of the first straight portion and the second straight portion of the respective guide holes are different from each other.

7. The active air flap system of claim 1, wherein the plurality of flaps further includes a rotation shaft member,
   wherein the first end of the flap linkage is fixed to a first axial end of the rotation shaft member, a second axial end of the rotation shaft member is rotatably connected to the housing, and the second end of the flap linkage is rotatably connected to the second end of the second link.

8. The active air flap system of claim 1, wherein the second guide hole is formed in the housing such that one end thereof is opened, and a cover is provided on the housing to cover the open end of the second guide hole.

9. The active air flap system of claim 8, wherein the second guide hole extends from the housing to the cover.

10. The active air flap system of claim 1, further including:
an actuator; and
a loader connecting the first link and the actuator,
wherein the loader includes a first loader portion having a first end connected to an output end of the actuator so as to rotate integrally with the actuator, and a second loader portion having a first end and a second end, and
wherein the first end is rotatably connected to a second end of the first loader portion, and the second end is rotatably connected to the first link.

11. The active air flap system of claim 7, wherein the rotation shaft member is provided with a plurality of flap members along a longitudinal direction of the rotation shaft member, wherein the plurality of flap members is configured to integrally open and close a plurality of openings formed in the exterior surface along a longitudinal direction of the rotation shaft member in response to the rotation of the rotation shaft member.

12. The active air flap system of claim 1, wherein a holding portion is formed along an outer periphery of the guide pin to regulate an axial movement of the guide pin.

13. The active air flap system of claim 1, wherein a flap of the plurality of flaps has a protrusion having a shape corresponding to the at least one opening.

14. The active air flap system of claim 13, wherein a front surface of the protrusion is configured to be flush with the exterior surface in a state in which the flap closes the at least one opening.

15. The active air flap system of claim 10, further comprising:
a controller configured to:
control the actuator, receive a signal related to at least one of a vehicle speed, an atmospheric temperature, a refrigerant pressure, or a coolant temperature from a sensor mounted on the vehicle, and
control a degree of opening and closing of the respective flaps based on the received signal.

16. An active air flap system for a vehicle, the active air flap system comprising:
an exterior surface disposed on a vehicle front side and having at least one opening through which external air is supplied into a vehicle interior;
a housing provided on a rear side of the exterior surface in a front-rear direction of the vehicle;
a plurality of flaps rotatably mounted on the housing and configured to open and close the at least one opening;
a driving section configured to rotate the plurality of flaps to open and close the at least one opening,
wherein the driving section includes:
a first link configured to linearly reciprocate within the housing and having a plurality of first guide holes corresponding to the plurality of flaps, respectively;
a plurality of second links having first ends guided by the respective first guide holes of the first link and second ends; and
a plurality of flap linkages having first ends and second ends, wherein the first ends of the plurality of flap linkages are rotatably connected to the second ends of the plurality of second links, respectively, and the second ends of the plurality of flap linkages are connected to the plurality of flaps, respectively,
an actuator; and
a loader connecting the first link and the actuator,
wherein the loader includes a first loader portion having a first end connected to an output end of the actuator so as to rotate integrally with the actuator, and a second loader portion having a first end and a second end, and
wherein the first end is rotatably connected to a second end of the first loader portion, and the second end is rotatably connected to the first link.

17. The active air flap system of claim 16, further comprising:
a controller configured to:
control the actuator, receive a signal related to at least one of a vehicle speed, an atmospheric temperature, a refrigerant pressure, or a coolant temperature from a sensor mounted on the vehicle, and
control a degree of opening and closing of the respective flaps based on the received signal.

* * * * *